United States Patent
Ray et al.

(10) Patent No.: US 8,711,881 B2
(45) Date of Patent: *Apr. 29, 2014

(54) PACKET BUNDLING AT THE PDCP LAYER

(75) Inventors: Siddharth Ray, Bridgewater, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

This patent is subject to a terminal disclaimer.

(21) Appl. No.: 12/652,636

(22) Filed: Jan. 5, 2010

(65) Prior Publication Data

US 2010/0208632 A1   Aug. 19, 2010

Related U.S. Application Data

(60) Provisional application No. 61/143,131, filed on Jan. 7, 2009.

(51) Int. Cl.
*H04J 3/22* (2006.01)

(52) U.S. Cl.
USPC .............................. 370/469; 714/48

(58) Field of Classification Search
USPC .................... 370/469, 216; 714/48
See application file for complete search history.

(56) References Cited

U.S. PATENT DOCUMENTS

| | | | |
|---|---|---|---|
| 7,571,358 B2 * | 8/2009 | Yi et al. ........................... | 714/48 |
| 2005/0238051 A1 * | 10/2005 | Yi et al. ........................ | 370/469 |
| 2007/0121540 A1 | 5/2007 | Sharp et al. | |
| 2007/0253447 A1 | 11/2007 | Jiang | |
| 2008/0031253 A1 | 2/2008 | Kim et al. | |
| 2008/0170531 A1 | 7/2008 | Petry et al. | |
| 2008/0188224 A1 | 8/2008 | Pani et al. | |
| 2009/0046626 A1 | 2/2009 | Shao et al. | |
| 2009/0086659 A1 | 4/2009 | Pani et al. | |
| 2009/0086853 A1 | 4/2009 | Ye | |
| 2009/0092079 A1 | 4/2009 | Marinier et al. | |
| 2009/0185477 A1 * | 7/2009 | Lee et al. ........................ | 370/216 |

(Continued)

FOREIGN PATENT DOCUMENTS

| | | |
|---|---|---|
| CN | 101170390 A | 4/2008 |
| CN | 101175024 A | 5/2008 |

(Continued)

OTHER PUBLICATIONS

Alcatel-Lucent: "Comparison of different SN handling at Layer 2" 3GPP Draft; R2-073455 Comparison of Different SN Handling at Layer 2, SRD Generation Partnership Project (3GPP), Mobile Competence Centre; 650, Route Des Lucioles; F-06921 Sophia-Antipolis Cedex; France, vol. RAN WG2, no. Athens, Greece; 20070815, Aug. 15, 2007, XP050136160 [retrieved on Aug. 15, 2007] p. 1-p. 2 p. 5-p. 6.

(Continued)

*Primary Examiner* — Wei Zhao
(74) *Attorney, Agent, or Firm* — Nerrie M. Zohn

(57) ABSTRACT

Certain aspects of the present disclosure provide a technique for bundling the received service data units (SDU) in a first communication layer to generate a protocol data unit (PDU) to pass to a second communication layer. For example, one or more packet data convergence protocol (PDCP) SDUs may be concatenated to generate a PDCP PDU and be sent to a radio link control (RLC) layer in the transmitter side. Similarly, one or more PDCP SDUs may be extracted from a PDCP PDU in the receiver side.

10 Claims, 7 Drawing Sheets

(56) References Cited

U.S. PATENT DOCUMENTS

| | | | |
|---|---|---|---|
| 2009/0290598 | A1 | 11/2009 | Pani et al. |
| 2009/0323671 | A1 | 12/2009 | Wu |
| 2010/0135212 | A1 | 6/2010 | Ho et al. |
| 2010/0135326 | A1 | 6/2010 | Ray et al. |
| 2010/0158044 | A1* | 6/2010 | Ray et al. ............... 370/469 |
| 2010/0189059 | A1* | 7/2010 | Yang ...................... 370/329 |
| 2010/0208654 | A1 | 8/2010 | Sampath et al. |

FOREIGN PATENT DOCUMENTS

| | | |
|---|---|---|
| CN | 101330492 A | 12/2008 |
| EP | 1119948 A1 | 8/2001 |
| JP | 2002527945 A | 8/2002 |
| JP | 2008113095 A | 5/2008 |
| JP | 2009509432 A | 3/2009 |
| JP | 2010508754 A | 3/2010 |
| WO | 0021253 A1 | 4/2000 |
| WO | 2007039023 A1 | 4/2007 |
| WO | 2008041596 A1 | 4/2008 |
| WO | 2008049472 A1 | 5/2008 |
| WO | 2008084992 A1 | 7/2008 |
| WO | WO2008137962 | 11/2008 |
| WO | 2008154816 A1 | 12/2008 |
| WO | 2009122831 A1 | 10/2009 |

OTHER PUBLICATIONS

International Search Report and Written Opinion—PCT/US2010/020369, International Search Authority—European Patent Office—Aug. 13, 2010
3GPP TS 36.322, "3rd Generation Partnership Project;Technical Specification Group Radio Access Network;Evolved Universal Terrestrial Radio Access (E-UTRA) Radio Link Control (RLC) protocol specification (Release 9)", version 9.0.0., Sections 5.1.2.2.3 and 5.1.3.2.3 , Dec. 2009.
3GPP TS 36.322, "3rd Generation Partnership Project;Technical Specification Group Radio Access Network;Evolved Universal Terrestrial Radio Access (E-UTRA)Radio Link Control (RLC) protocol specification (Release 8)", V8.1.0 (V), Sections 5.1.2.2.3 and 5.1.3.2.3, Mar. 2008.
3GPP TS 36.322, "3rd Generation Partnership Project;Technical Specification Group Radio Access Network;Evolved Universal Terrestrial Radio Access (E-UTRA)Radio Link Control (RLC) protocol specification(Release 8)", V8.0.0, 5.1.2 and 5.1.3, Dec. 2007.
Ericsson: "Configurable values for the minimum and maximum RLC PDU size", 3GPP Draft; R2-081505, 3rd Generation Partnership Project (3GPP), Mobile Competence Centre ; 650, Route Des Lucioles ; F-06921 Sophia-Antipolis Cedex ; France, vol. RAN WG2, no. Shenzhen, China; 20080324, Mar. 24, 2008, XP050139246.
Ericsson: "Configurable values for the minimum and maximum RLC PDU size", 3GPP Draft; R2-082771, 3rd Generation Partnership Project (3GPP), Mobile Competence Centre ; 650, Route Des Lucioles ; F-06921 Sophia-Antipolis Cedex ; France, vol. RAN WG2, no. Kansas City, USA; 20080509, May 9, 2008, XP050140357.
Motorola: "Introduction of new MAC-ehs test cases" 3GPP Draft; R5-073408, 3rd Generation Partnership Project (3GPP), Mobile Competence Centre ; 650, Route Des Lucioles ; F-06921 Sophia-Antipolis Cedex; France, vol. RAN WG5, no. Jeju; 20071109, Nov. 9, 2007, XP050186230.
RLC SDU larger than 2047 octets, 3GPP TSG RAN WG2 #64 meeting R2-086818, Nov. 10-14, 2008, Prague, Czech Republic, Source: Panasonic.
Taiwan Search Report—TW099100306—TIPO—Mar. 16, 2013.
"Universal Mobile Telecommunications System (UMTS); Medium Access Control (MAC) protocol specification (3GPP TS 25.321 version 7.7.0 Release 7); ETSI TS 125 321" ETSI Standards, Lis, Sophia Antipolis Cedex, France, vol. 3-R2, No. V7.7.0, Jan. 1, 2008, XP014040632, ISSN: 0000-0001.
Universal Mobile Telecommunications System (UMTS); Radio Link Control (RLC) protocol specification (3GPP TS 25.322 version 7.7.0 Release 7); ETSI TS 125 322, ETSI'Standard, European Telecommunications Standards Institute (ETSI), Sophia Antipolis Cedex, France, vol. 3-R2, No. V7.7.0, Jul. 1, 2008, XP014042118.
3GPP: "Technical Specification Group Radio Access Network; Radio Link Control (RLC) protocol specification (Release 7)", 3rd Generation Partnership Project; 3GPP TS 25.322 V7.7.0 (May 2008), Sophia Antipolis Valbonne, May 31, 2008, pp. 1-82.

\* cited by examiner

US 8,711,881 B2

PACKET BUNDLING AT THE PDCP LAYER

CLAIM OF PRIORITY UNDER U.S.C. §119

The present application for patent claims benefit of U.S. Provisional Patent Application Ser. Nos. 61/143,131 filed Jan. 7, 2009, entitled, "Packet Bundling at the PDCP Layer," and assigned to the assignee hereof and hereby expressly incorporated by reference herein.

TECHNICAL FIELD

Certain embodiments of the present disclosure generally relate to wireless communications and, more particularly, bundling of service data units (SDUs) in a communication layer.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output, multiple-input-single-output or a multiple-input-multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes receiving one or more service data units (SDU) in a first communication layer, concatenating the SDUs to generate a protocol data unit (PDU), and sending the PDU to a second communication layer.

Certain aspects of the present disclosure provide a method for wireless communications. The method generally includes receiving a protocol data unit (PDU) in a first communication layer, extracting one or more service data units (SDU) from the PDU, and sending the one or more SDUs to a second communication layer for further processing.

Certain aspects of the present disclosure provide an apparatus for wireless communications. The apparatus generally includes logic for receiving one or more service data units (SDU) in a first communication layer, logic for concatenating the SDUs to generate a protocol data unit (PDU), and logic for sending the PDU to a second communication layer.

Certain aspects of the present disclosure provide an apparatus for wireless communications. The apparatus generally includes logic for receiving a protocol data unit (PDU) in a first communication layer, logic for extracting one or more service data units (SDU) from the PDU, and logic for sending the one or more SDUs to a second communication layer for further processing.

Certain aspects of the present disclosure provide an apparatus for wireless communications. The apparatus generally includes means for receiving one or more service data units (SDU) in a first communication layer, means for concatenating the SDUs to generate a protocol data unit (PDU), and means for sending the PDU to a second communication layer.

Certain aspects of the present disclosure provide an apparatus for wireless communications. The apparatus generally includes means for receiving a protocol data unit (PDU) in a first communication layer, means for extracting one or more service data units (SDU) from the PDU, and means for sending the one or more SDUs to a second communication layer for further processing.

Certain aspects of the present disclosure provide a computer-program product for wireless communications, comprising a computer-readable medium having instructions stored thereon, the instructions being executable by one or more processors. The instructions generally include instructions for receiving one or more service data units (SDU) in a first communication layer, instructions for concatenating the SDUs to generate a protocol data unit (PDU), and instructions for sending the PDU to a second communication layer.

Certain aspects of the present disclosure provide a computer-program product for wireless communications, comprising a computer-readable medium having instructions stored thereon, the instructions being executable by one or more processors. The instructions generally include instructions for receiving a protocol data unit (PDU) in a first communication layer, instructions for extracting one or more service data units (SDU) from the PDU, and instructions for sending the one or more SDUs to a second communication layer for further processing.

Certain aspects of the present disclosure provide an apparatus for wireless communications. The apparatus generally includes at least one processor configured to receive one or more service data units (SDU) in a first communication layer, concatenate the SDUs to generate a protocol data unit (PDU), and send the PDU to a second communication layer.

Certain aspects of the present disclosure provide an apparatus for wireless communications. The apparatus generally includes at least one processor configured to receive a protocol data unit (PDU) in a first communication layer, extract one or more service data units (SDU) from the PDU, and send the one or more SDUs to a second communication layer for further processing.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
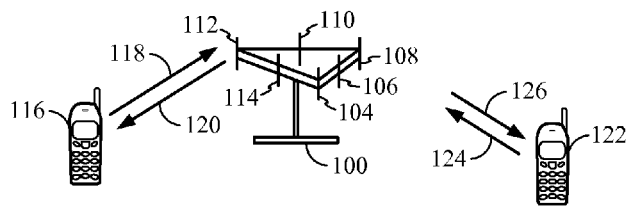
FIG. 1 illustrates a multiple access wireless communication system, in accordance with certain embodiments of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
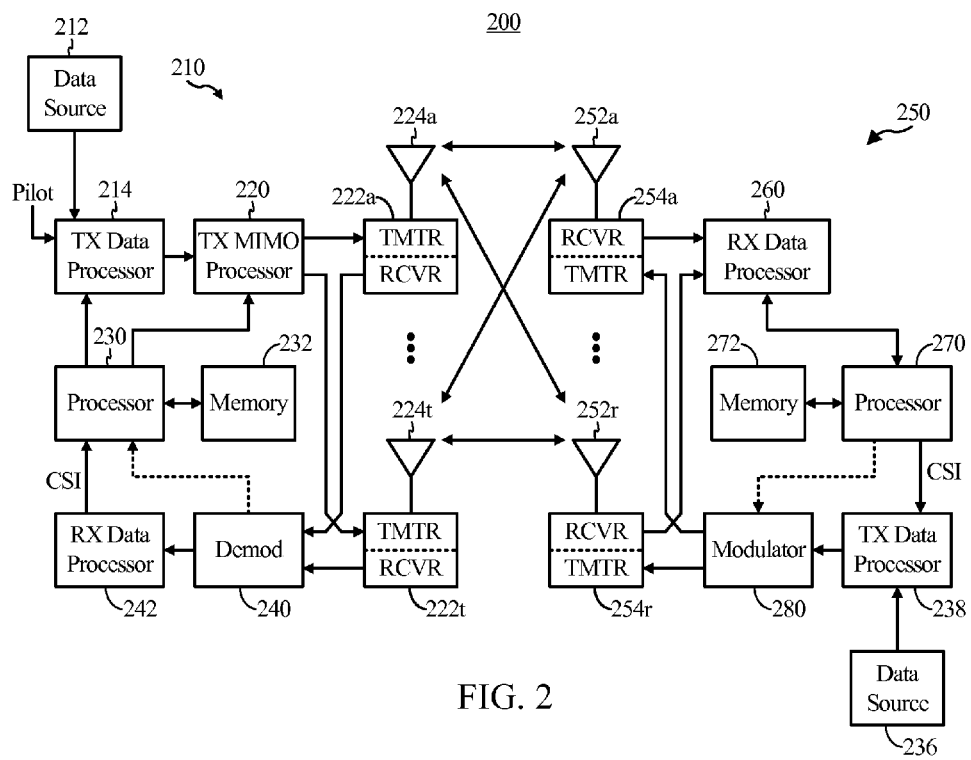
FIG. 2 illustrates a block diagram of a communication system, in accordance with certain embodiments of the present disclosure.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Packet Bundling at the PDCP Layer

Certain embodiments of the present disclosure propose techniques for bundling packets in a communication layer to reduce the just-in-time processing complexity of transmit and receive data paths. Therefore, high data rates could be supported.

Figure 3:
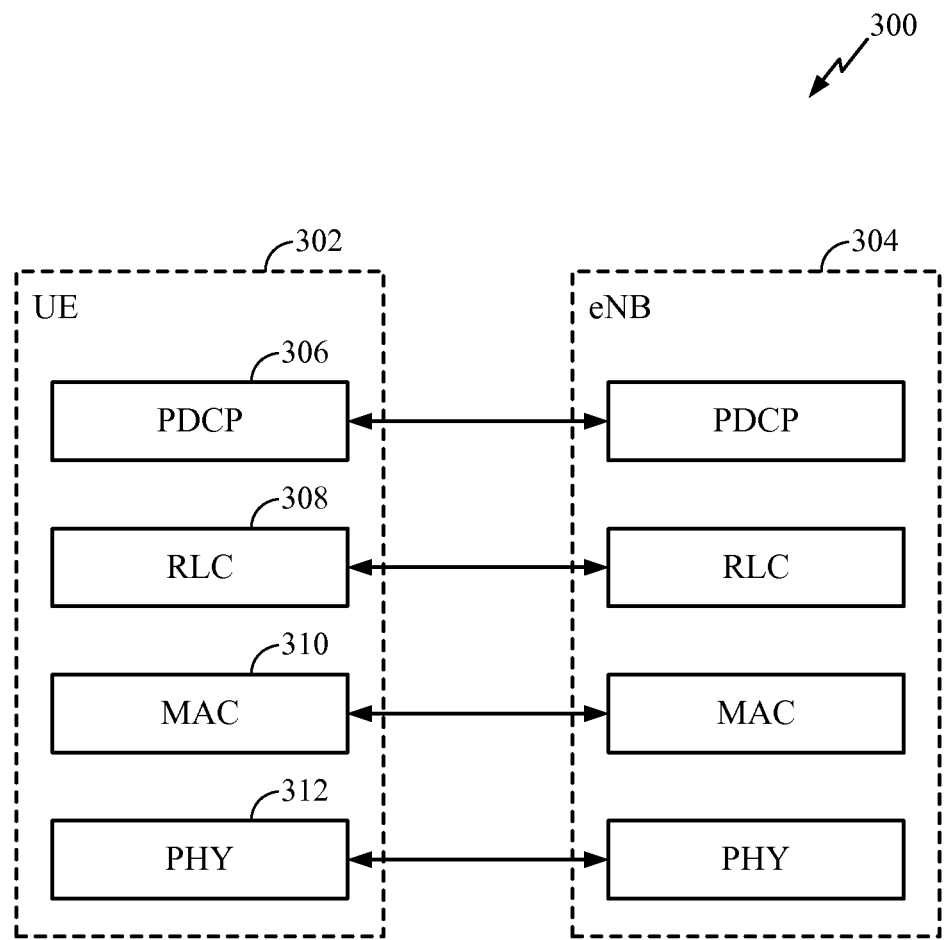
FIG. 3 illustrates user plane protocol stack for a transmitter and a receiver in the LTE standard.

In a wireless communication system, transmitters and receivers may communicate through a multiple layer protocol stack. FIG. 3 illustrates user plane protocol stack for a user equipment (UE) 302 and an evolved node B (eNB) 304 in the LTE standard. The protocol stack may include a packet data convergence protocol (PDCP) layer 306, a radio link control (RLC) layer 308, a medium access control (MAC) layer 310 and a physical (PHY) layer 312. The physical layer performs the physical transport of data between the UE and the eNB.

In the transmitter side, each layer receives service data units (SDUs) from a higher layer, adds headers to the SDUs to generate protocol data units (PDU), and sends the PDUs to a lower layer. The PDUs are treated as SDUs by the lower layer.

For a typical data transmission, the PDCP layer receives packets (PDCP SDU) from an upper layer and processes them into PDCP PDUs which are submitted to a lower layer. As specified currently in the 3GPP specifications, the mapping between the PDCP SDU and the PDCP PDU is a one-to-one relationship. Therefore, every PDCP PDU is generated from exactly one PDCP SDU.

Similarly, on the receiver side, the PDCP layer receives packets (PDCP PDUs) from a lower layer and extracts a PDCP SDU for further processing at the upper layer. As specified currently in the 3GPP specifications, the mapping between the PDCP PDU and PDCP SDU is a one-to-one relationship. Therefore, every PDCP SDU is generated from exactly one PDCP PDU.

As generally used in the following description, an SDU is any packet that is received from an upper layer in the transmitter side or passed to an upper layer in the receiver side, whereas a PDU is a packet generated by a layer and passed on to a lower layer in the transmitter side or received from a lower layer in the receiver side.

Therefore, for example, a PDCP PDU is an RLC SDU in the transmitter side. Similarly, an RLC PDU is a MAC SDU, and so forth. In general, each layer in the transmitter side may add information, typically in the form of a header, to SDU data to generate a PDU and pass it to a lower layer.

Figure 4:
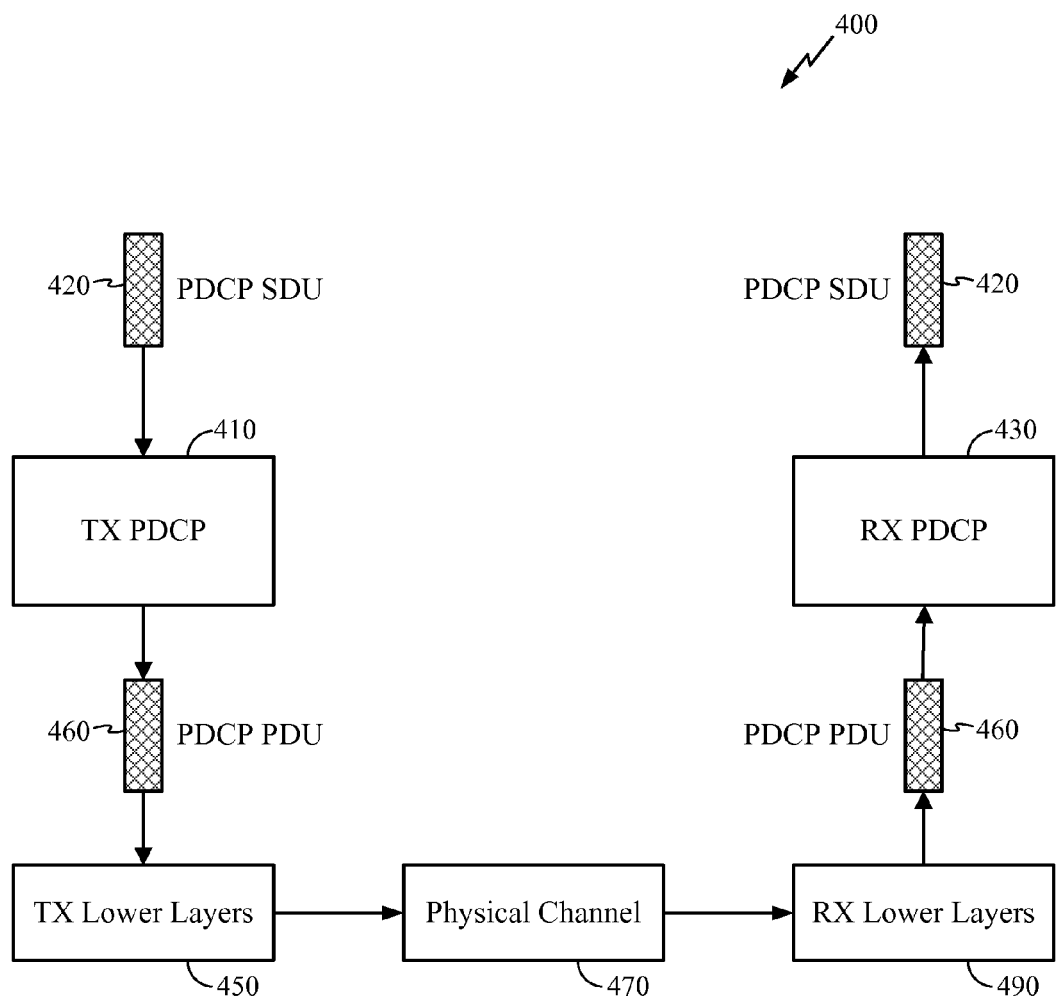
FIG. 4 illustrates an example block diagram of a packet data convergence protocol (PDCP) layer architecture.

FIG. 4 illustrates a block diagram of transmission and reception by a PDCP layer. At the transmitter side, the PDCP layer 410 receives a packet (PDCP SDU 420) for processing from an upper layer. The PDCP layer processes the packet into a PDCP PDU 460 which may be submitted to a lower layer 450. The packet may then be transmitted through a physical channel 470. In this architecture, a single PDCP PDU 460 is generated from exactly one PDCP SDU 420.

Similarly, on the receiver side, the PDCP layer receives a packet (PDCP PDU 460) from a lower layer 490 and extracts the PDCP SDU 420 to send to an upper layer for further processing. Since the mapping between the PDCP PDU and PDCP SDU is a one-to-one relationship, every PDCP SDU is generated from exactly one PDCP PDU.

Figure 5:
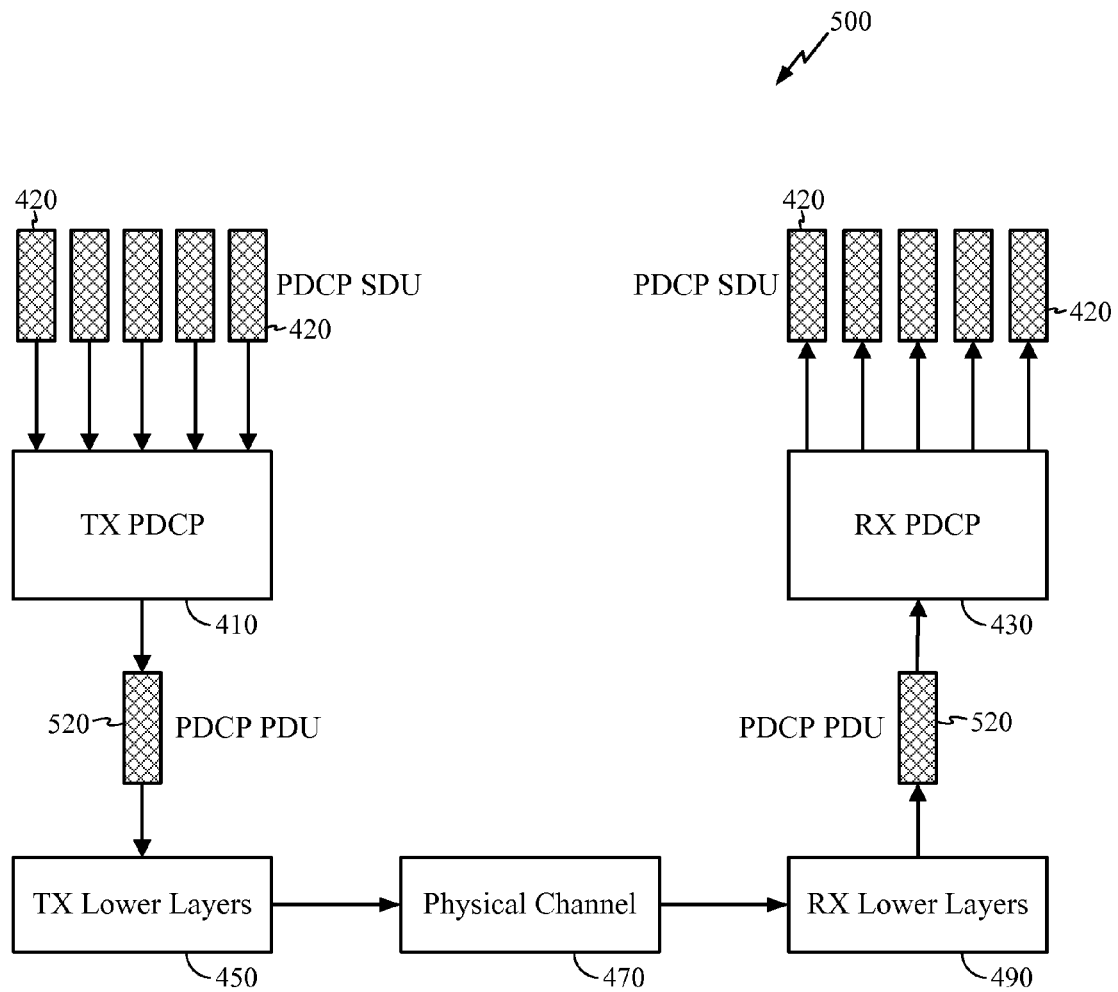
FIG. 5 illustrates an example block diagram for the proposed PDCP layer architecture, in accordance with certain embodiments of the present disclosure.

FIG. 5 illustrates a block diagram of packet transmission and reception in the proposed PDCP layer architecture 500, in accordance with certain embodiments of the present disclosure. At the transmitter side, the PDCP layer 410 receives one or more packets (PDCP SDUs 420) for processing from an upper layer.

Although only five PDCP SDUs are illustrated, an arbitrary number of PDCP SDUs may be received and processed at the PDCP layer. The PDCP layer may concatenate one or more PDCP SDUs to generate a PDCP PDU 520 before submitting to a lower layer.

For certain embodiments of the present disclosure, the mapping between PDCP SDUs and PDCP PDUs may be many-to-one. Therefore, each PDCP PDU may be generated from one or more PDCP SDUs. The bundling of multiple PDCP SDUs into a single PDCP PDU at the PDCP layer may be accomplished in many ways. For certain embodiments, the bundling may be accomplished prior to the processing operations in the PDCP layer. For certain embodiments, the bundling may be performed in between various PDCP processing operations. For certain embodiments, the bundling may be performed after PDCP processing operations.

The PDCP PDU 520 may be submitted to the lower layers 450 for transmission through a physical channel 470. In the proposed scheme, a single PDCP PDU 520 is generated from one or more PDCP SDUs 420.

Similarly, on the receiver side, the PDCP layer receives a packet (PDCP PDU 520) from a lower layer 490 and extracts one or more PDCP SDUs 420. For certain embodiments of the present disclosure, the mapping between the PDCP PDU and PDCP SDU may be a one-to-many relationship. Therefore, one or more PDCP SDUs may be extracted from every received PDCP PDU.

For certain embodiments, similar to the transmitter side, the unbundling of multiple PDCP SDUs from a single PDCP PDU may be accomplished prior to, after or in between processing operations in the PDCP layer.

Figure 6:
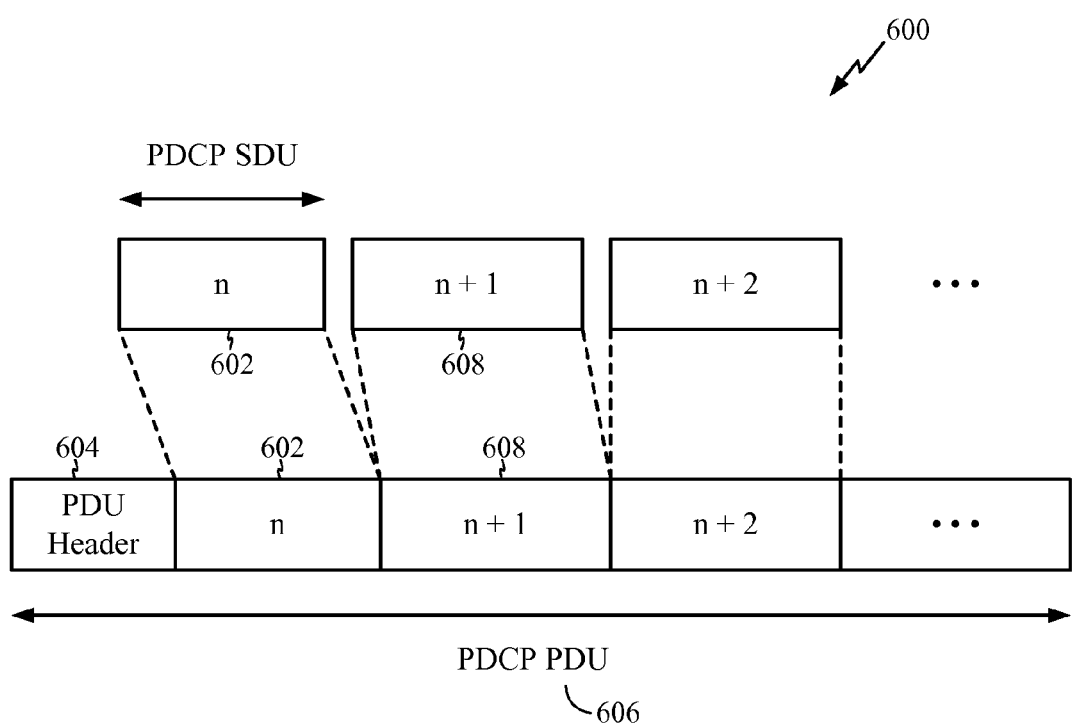
FIG. 6 illustrates example PDCP service data units (SDU) and a PDCP protocol data unit (PDU), in accordance with certain embodiments of the present disclosure.

FIG. 6 illustrates example 600 PDCP SDUs and a PDCP PDU 606, in accordance with certain embodiments of the present disclosure. As illustrated, one or more PDCP SDUS 602, 608 may be concatenated to generate a PDCP PDU 606. In addition, the PDCP layer adds a PDU header 604 to the PDCP PDU before sending it to other layers.

Figure 7:
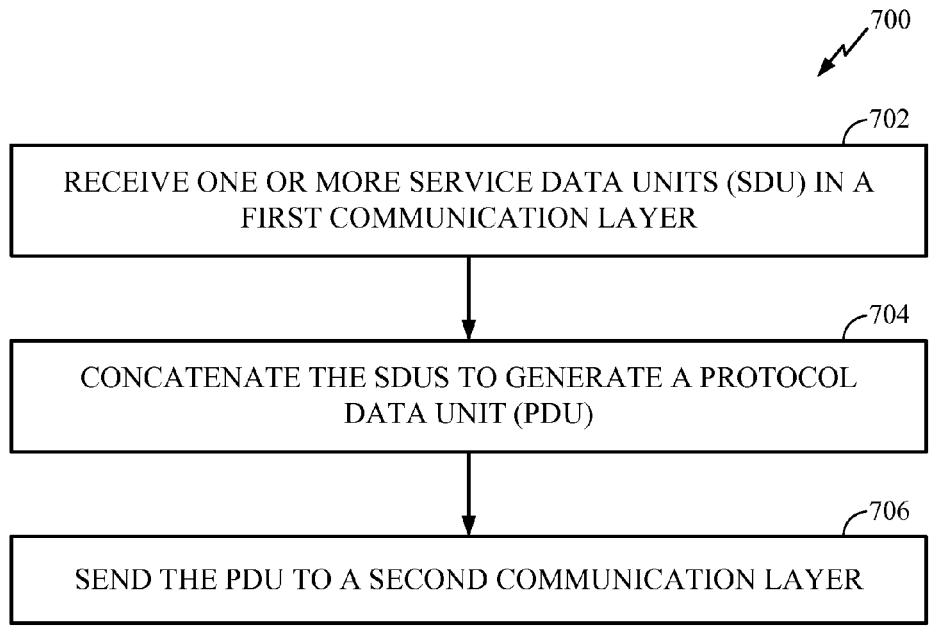
FIG. 7 illustrates example transmitter-side operations for bundling service data units, in accordance with certain embodiments of the present disclosure.

FIG. 7 illustrates example transmitter-side operations 700 for bundling service data units, in accordance with certain embodiments of the present disclosure. At 702, a transmitter receives one or more SDUs in a first communication layer. For example, the firs communication layer may be a PDCP layer.

At 704, the transmitter concatenates the SDUs to generate a PDU. At 706, the transmitter sends the PDU to a second communication layer. As an example, the second communication layer may be an RLC layer.

Figure 8:
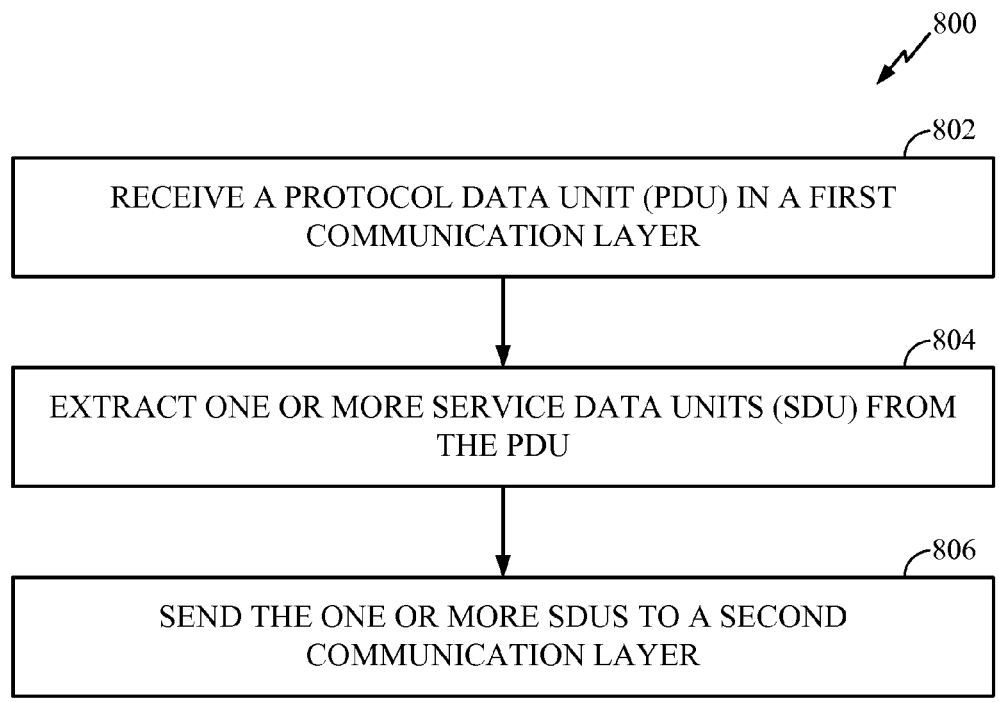
FIG. 8 illustrates example receiver-side operations for extracting service data units from a bundle, in accordance with certain embodiments of the present disclosure.

FIG. 8 illustrates example receiver-side operations 800 for extracting service data units from a PDU bundle, in accordance with certain embodiments of the present disclosure. At 802, a receiver receives a PDU in a first communication layer. For example, the first communication layer may be a PDCP layer.

At 804, the receiver extracts one or more SDUs from the PDU. At 806, the receiver processes or sends the one or more SDUs to a second communication layer for further processing.

The present disclosure proposed techniques to reduce the processing time at a communication layer by bundling the SDUs. The bundling results in significant MIPS (million instructions per second) reduction both in the transmitter and the receiver sides. In addition, high data rate may be supported in a system utilizing the proposed techniques.

Figure 7A:
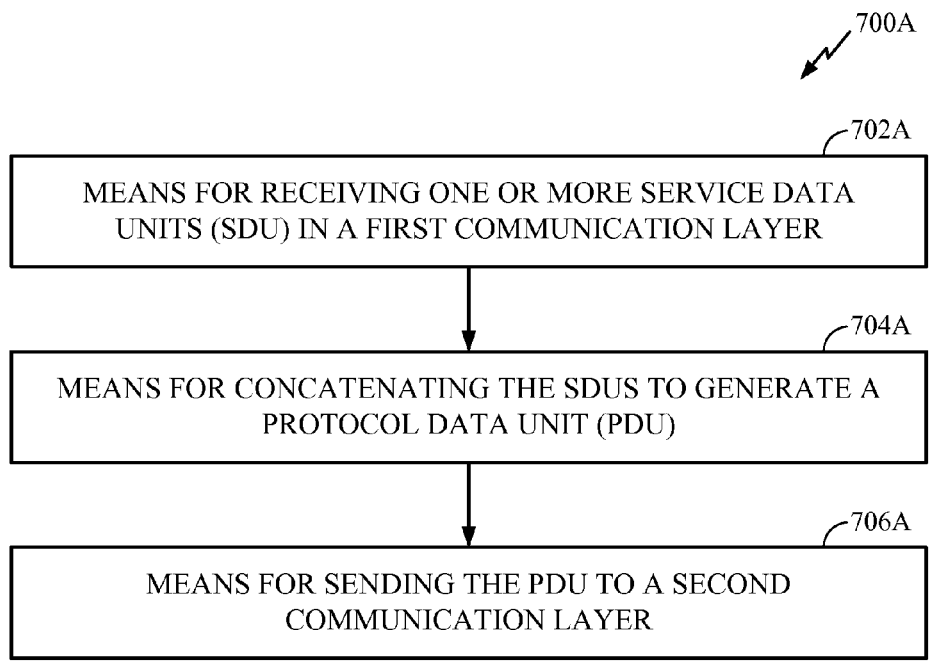
FIG. 7A illustrates example components capable of performing the operations illustrated in FIG. 7.
Figure 8A:
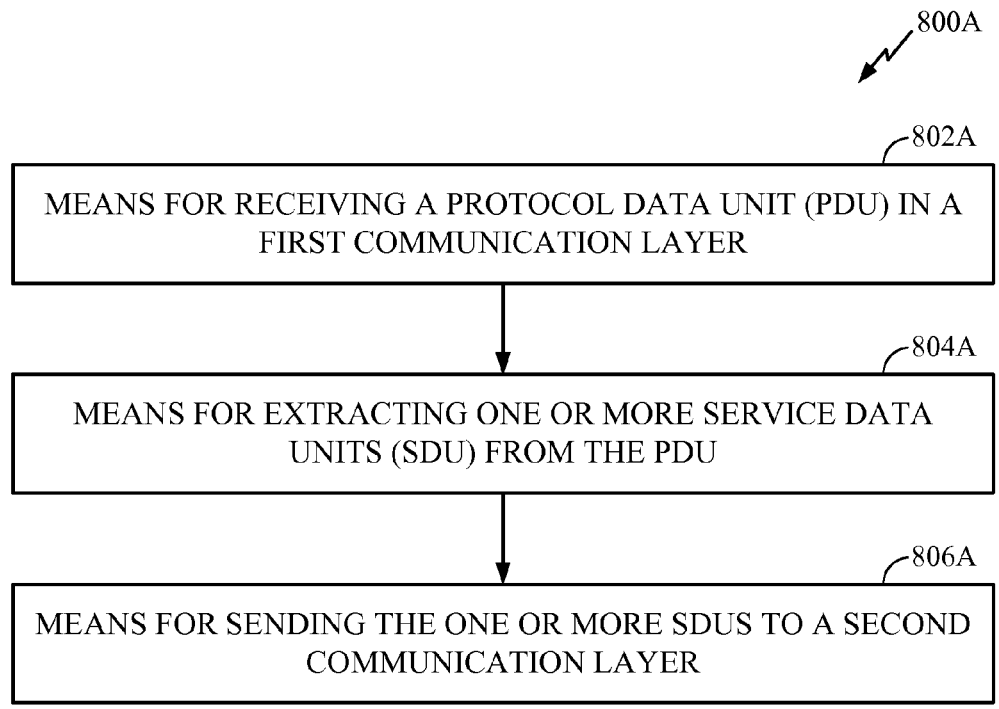
FIG. 8A illustrates example components capable of performing the operations illustrated in FIG. 8.

The various operations of methods described above may be performed by various hardware and/or software component(s) and/or module(s) corresponding to means-plus-function blocks illustrated in the Figures. For example, blocks 702-706 illustrated in FIG. 7 correspond to means-plus-function blocks 702A-706A illustrated in FIG. 7A. In addition, blocks 802-806 illustrated in FIG. 8 correspond to means-plus-function blocks 802A-806A illustrated in FIG. 8A More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
receiving two or more packet data convergence protocol (PDCP) service data units (SDUs) in a PDCP layer;
concatenating the PDCP SDUs based on a many to one mapping of PDCP SDUs to a PDCP protocol data unit (PDU), by the PDCP layer, to generate the PDCP PDU before submitting the PDCP PDU to a lower layer; and
sending the PDCP PDU to a radio link control (RLC) layer.

2. The method of claim 1, wherein concatenating is performed after processing operations in the PDCP layer.

3. A method for wireless communications, comprising:
receiving a single packet data convergence protocol (PDCP) protocol data unit (PDU) in a PDCP layer;
extracting, by the PDCP layer, two or more PDCP service data units (SDUs) from the single PDCP PDU, wherein the two or more PDCP SDUs are concatenated in the single PDCP PDU based on a many to one mapping of PDCP SDUs to the single PDCP PDU before submitting the PDCP PDU to a lower layer; and
sending the two or more PDCP SDUs to a second communication layer for further processing.

4. The method of claim 3, wherein extracting is done prior to processing operations in the PDCP layer.

5. An apparatus for wireless communications, comprising:
means for receiving two or more packet data convergence protocol (PDCP) service data units (SDUs) in a PDCP layer;
means for concatenating the PDCP SDUs based on a many to one mapping of PDCP SDUs to a PDCP protocol data unit (PDU), by the PDCP layer, to generate the PDCP PDU before submitting the PDCP PDU to a lower layer; and
means for sending the PDCP PDU to a radio link control (RLC) layer.

6. An apparatus for wireless communications, comprising:
means for receiving a single packet data convergence protocol (PDCP) protocol data unit (PDU) in a PDCP layer;
means for extracting, by the PDCP layer, two or more PDCP service data units (SDUs) from the single PDCP PDU, wherein the two or more PDCP SDUs are concatenated in the single PDCP PDU based on a many to one mapping of PDCP SDUs to the single PDCP PDU before submitting the PDCP PDU to a lower layer; and
means for sending the two or more PDCP SDUs to a second communication layer for further processing.

7. A computer-program product for wireless communications, comprising a non-transitory computer readable medium having instructions stored thereon, the instructions being executable by one or more processors and the instructions comprising:
instructions for receiving two or more packet data convergence protocol (PDCP) service data units (SDUs) in a PDCP layer;
instructions for concatenating the SDUs based on a many to one mapping of PDCP SDUs to a PDCP protocol data unit (PDU), by the PDCP layer, to generate a PDCP PDU before submitting the PDCP PDU to a lower layer; and
instructions for sending the PDCP PDU to a radio link control (RLC) layer.

8. A computer-program product for wireless communications, comprising a non-transitory computer readable medium having instructions stored thereon, the instructions being executable by one or more processors and the instructions comprising:
instructions for receiving a single packet data convergence protocol (PDCP) protocol data unit (PDU) in a PDCP layer;
instructions for extracting, by the PDCP layer, two or more PDCP service data units (SDUs) from the single PDCP PDU, wherein the two or more PDCP SDUs are concatenated in the single PDCP PDU based on a many to one mapping of PDCP SDUs to the single PDCP PDU before submitting the PDCP PDU to a lower layer; and
instructions for sending the two or more PDCP SDUs to a second communication layer for further processing.

9. An apparatus for wireless communications, comprising at least one processor configured to:
receive two or more packet data convergence protocol (PDCP) service data units (SDUs) in a PDCP layer;
concatenate the PDCP SDUs based on a many to one mapping of PDCP SDUs to a PDCP protocol data unit (PDU), by the PDCP layer, to generate the PDCP PDU before submitting the PDCP PDU to a lower layer; and
send the PDCP PDU to a radio link control (RLC) layer.

10. An apparatus for wireless communications, comprising at least one processor configured to:
receive a single packet data convergence protocol (PDCP) protocol data unit (PDU) in a PDCP layer;
extract two or more PDCP service data units (SDUs) by the PDCP layer, from the single PDCP PDU, wherein the two or more PDCP SDUs are concatenated in the single PDCP PDU based on a many to one mapping of PDCP SDUs to the single PDCP PDU before submitting the PDCP PDU to a lower layer; and
send the two or more PDCP SDUs to a second communication layer for further processing.

* * * * *